(12) United States Patent
Day, III et al.

(10) Patent No.: US 6,687,905 B1
(45) Date of Patent: Feb. 3, 2004

(54) MULTIPLE PORT INPUT/OUTPUT JOB SCHEDULING

(75) Inventors: Kenneth Fairclough Day, III, Tucson, AZ (US); Douglas William Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 09/636,316

(22) Filed: Aug. 11, 2000

(51) Int. Cl.[7] .............................................. G06F 9/00
(52) U.S. Cl. ..................... 718/102; 718/100; 710/36; 710/39; 710/60
(58) Field of Search .................... 709/100, 101, 709/102, 103; 710/60, 39, 315, 36; 712/11, 12; 718/1, 100, 102, 103, 104

(56) References Cited

U.S. PATENT DOCUMENTS

| | | | | |
|---|---|---|---|---|
| 5,179,702 A | * | 1/1993 | Spix et al. ................... 709/102 |
| 5,386,517 A | * | 1/1995 | Sheth et al. .................. 710/60 |
| 5,519,883 A | * | 5/1996 | White et al. ................. 710/315 |
| 5,867,480 A | | 2/1999 | Thomas et al. ............. 370/230 |
| 5,867,723 A | * | 2/1999 | Chin et al. .................... 712/11 |
| 5,941,969 A | | 8/1999 | Ram et al. ................... 710/128 |
| 5,970,229 A | | 10/1999 | Thomas et al. ........ 395/200.42 |
| 5,987,621 A | | 11/1999 | Duso et al. ..................... 714/4 |
| 6,006,342 A | | 12/1999 | Beardsley et al. ............. 714/5 |
| 6,292,856 B1 | * | 9/2001 | Marcotte ..................... 710/39 |

* cited by examiner

Primary Examiner—Majid A. Banankhah
(74) Attorney, Agent, or Firm—John H. Holcombe (57) ABSTRACT

A multi-port adapter and method for scheduling jobs at the adapter input/output ports. A plurality of queues are provided, each associated with one of the input/output ports. A processor arranges the jobs in each of the queues in a normal queued order for selection by the associated port. Upon selecting a next job for one of the ports, the processor determines the number of queued jobs of each of the queues for each of the other ports; and determines whether the number of queued jobs of each queue for the other ports is less than a threshold. If the number of jobs is less than the threshold, the processor selects the next job for the one port from the jobs in the queue for the one port identified as one that may be conducted in out of queue order, e.g., having attached heuristic information; else, selects the next job for the one port from the jobs in the queue for the one port on the normal queued basis. The identified job may be part of an operation involving two of the ports, and gives the job priority so that another port is less likely to have to be idle while waiting for the one port.

40 Claims, 4 Drawing Sheets

MULTIPLE PORT INPUT/OUTPUT JOB SCHEDULING

FIELD OF THE INVENTION

This invention relates to intermediate controllers that transparently duplicate host data utilizing multiple connections to differing end devices such as data storage devices, and, more particularly, to the scheduling of jobs for the connections to the end devices, with the goal of increasing the overall throughput of the system.

BACKGROUND OF THE INVENTION

Intermediate controllers may employ multiple single port adapters or may employ an adapter within the controller having multiple input/output ports in order to allow the transfer of data to and from more than one receiving device or subsystem, and to allow the transfers to be parallel and often independent, so as to provide high throughput. The intermediate controller may be connected to one or more hosts through one or more host adapters and ports. The end devices may comprise separate receiving devices, or may comprise multiple devices in a single receiving subsystem. An example comprises a data storage subsystem having dual data storage libraries for duplicating the stored data. A controller may comprise data processors and memory coupling to the adapters with a PCI bus, such as an IBM RS-6000 processor. In turn, each of the adapters may comprise data processors and memory along with interfaces appropriate to the connection types of the ports they contain, such as ESCON, FICON, SCSI, FIBER CHANNEL, etc.

The controller and each adapter may be provided with appropriate operating systems and application programs for operating the controller and input/output adapter to conduct the data transfer and other needed functions.

In many situations, however, the transfer of data may be between two of the end storage devices coupled to the input/output ports, as well as the primary function of transferring data from the host to one or more of the end storage devices coupled to the input/output ports. Thus, the transfers through the input/output ports are no longer independent of each other, and the operation of one input/output port is dependent upon the availability of data from the other input/output port. As an example, it may be desirable to copy data from a subsystem at one input/output port to another subsystem at another input/output port in a copy operation. Typically, this involves a read job at one input/output port and a write job at the other input/output port. A number of jobs may be queued at each of the ports, and the read and write jobs must wait until they reach the end of the queue. However, at times, the other, independent operations at one of the input/output ports may be conducted slowly as compared to the operations at the other input/output port. Alternatively, or additionally, the number of queued jobs at one of the input/output ports may greatly exceed the number of queued jobs at the other input/output port. In either case, the operation at the other input/output port, which may be the write job, may have to be idle and wait until the job at the one input/output port, the read job, reaches the end of the queue and is processed.

A specific example of the need to copy is the redundant storage of data in dual libraries. The data may be initially received from a host system and stored in one of the libraries by the controller through an adapter, and then the host is released. The controller will then, at a subsequent time, read the data from the one library and write it to the dual library, thereby creating a copy of the data. The data cannot be written to the dual library until it is read from the one library. Thus, the write job at the other input/output port must wait until the read job at the one input/output port reaches the end of the queue and is processed.

As the result, one of the input/output ports must be in wait mode at such times, reducing the throughput of the controller at the multiple ports, with the further result that the overall use of the controller becomes less efficient.

SUMMARY OF THE INVENTION

An object of the present invention is to increase the throughput of a controller through multiple ports, increasing the efficiency of the controller.

Disclosed are a controller and method for scheduling jobs at input/output ports. The controller comprises a plurality of queues, each associated with one of the input/output ports, and at least one processor. The processor arranges the jobs in each of the queues in a normal queued order for selection by the associated port. Upon selecting a next job for one of the ports, the processor determines the number of queued jobs of each of the queues for each of the other ports. The processor determines whether the number of queued jobs of each queue for the other ports is less than a threshold. If the number of jobs is less than the threshold, meaning that any job thereat coordinating with the one port would have to wait for the one port to complete before proceeding, the processor selects the next job for the one port from the jobs in the queue for the one port which is identified as one that may be conducted out of queue order, for example, as having a relationship with the other port; else, the processor selects the next job for the one port from the jobs in the queue for the one port on the normal queued basis. Identification may be made by attaching heuristic information to the queued job. As an example, the job may be part of an operation involving two of the ports, and the invention thus gives the job priority so that another port is less likely to have to be idle while waiting for the one port.

In one embodiment, the controller may comprise a multi-port adapter for providing the multiple ports, and the controller may attach the hueristic information to jobs of the adapter queues. In another embodiment, the controller may comprise a plurality of single port adapters and may maintain the queues and job identification.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1A:
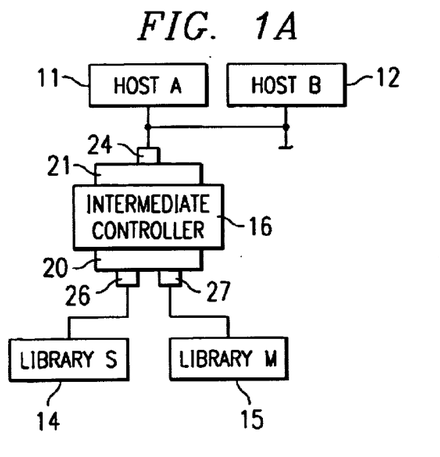
FIGS. 1A and 1B are block diagrams showing interconnection of components of a data transfer system employing embodiments of a controller and the method of the present invention.
Figure 1B:
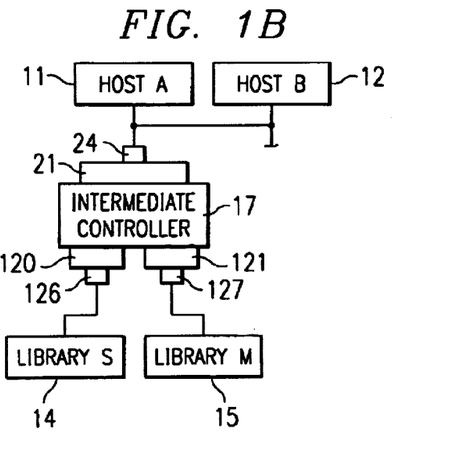

Referring to FIGS. 1A and 1B, two embodiments of interconnection of components of a data transfer system are illustrated, for example, which redundantly couple host systems 11 and 12 to multiple data storage libraries 14 and 15, employing an intermediate controller 16, 17 in accordance with the present invention.

In the illustrated examples of the dual data storage libraries, one of the data storage libraries is designated as a "MASTER" library, e.g., library 15, and the other data storage library(ies) designated as a "SLAVE" library, e.g., library 14. The exemplary host systems 11 and 12 may be embodied by a variety of types and numbers of processing units, servers, or computing systems. The elements depicted as data storage libraries 14 and 15 may comprise any storage device, such as libraries for storing removable rewritable data storage media, e.g., tape cartridges or optical disks, or such as disk drive system with non-removable media. An example of a suitable data storage library is the IBM 3494 Virtual Tape Storage System.

A way of redundantly storing data in the multiple data storage libraries is to first write the data to one of the data storage libraries, and, subsequently, to copy the data from the one library to another library. In the instant example, data may be initially received from a host system and stored in one of the data storage libraries, e.g., library 15, through controller 16, 17, and then the host is released. The controller itself then, at a subsequent time, conducts a data transfer, reading the data from the one library 15 and writing it to the other library, e.g., library 14, thereby creating a copy of the data at the other library. The data cannot be written to the other library until it is read from the one library.

Figure 2A:
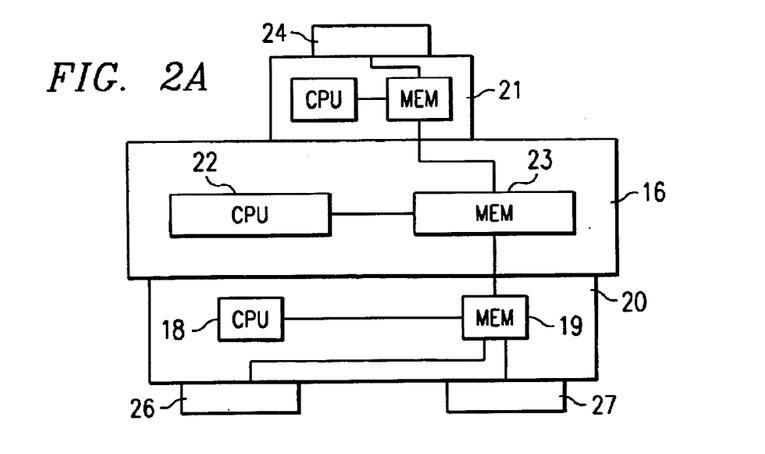
FIGS. 2A and 2B are block diagrams showing functional components of embodiments of controllers implementing the present invention.

Referring to FIGS. 1A and 2A, in one embodiment, the controller 16 comprises a multi-port adapter 20, a data processor 22 with a non-volatile memory 23 for storing the operating system, application programs and any operating data, such as queues, and a host adapter 21. The host adapter 21 comprises a port 24 and the multi-port adapter 20 comprises ports, 26 and 27 which each interfaces with the appropriate connections to couple to the libraries 14, 15 and to the host systems 11, 12, such as PCI, ESCON, FICON, SCSI, FIBER CHANNEL, etc. Each of the adapters comprises a processor and memory, the multi-port adapter 20 comprising a processor 18 and memory 19.

Figure 2B:
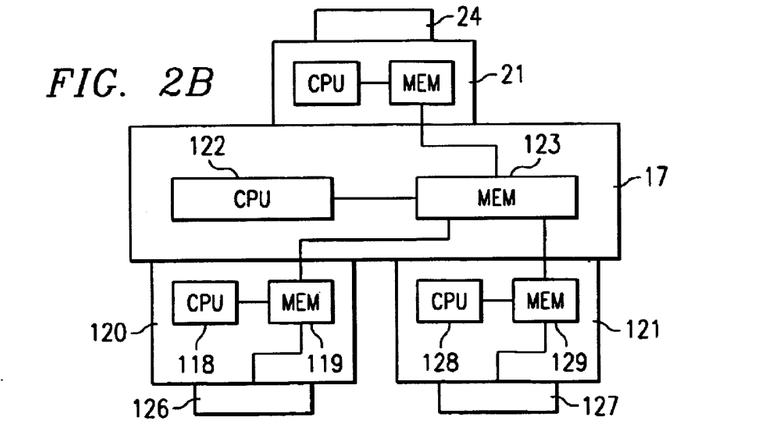

Referring to FIGS. 1B and 2B, in an alternative embodiment, the controller 17 comprises a plurality of single port adapters 120 and 121, a data processor 122 with a non-volatile memory 123 for storing the operating system, etc., similar to controller 16 of FIG. 2A. Controller 17 also comprises a host adapter 21 with at least one port 24 for coupling to the host systems 11, 12. Controller 17 differs from controller 16 by comprising a plurality of single port adapters, such as adapters 120 and 121, which have input/output ports 126 and 127, respectively, for coupling to the libraries 14, 15. As discussed above, the adapters and ports each provides the appropriate interfaces and connections, each adapter comprising a processor and memory, e.g., processor 118 and memory 119 of adapter 120, and processor 128 and memory 129 of adapter 121. As defined by the present invention, a controller may comprise at least one computer processor including that of any incorporated adapter, and each port may comprise adapter hardware operated by the computer processor. Other suitable terminology for the present "controller", comprises "director" or "adapter", and those of skill in the art may envision other applications of the present invention. The data processor 22, 122 may comprise a workstation or similar processor with or without a display, such as an IBM RS-6000 processor, and the adapter processors may comprise microprocessors, such as the Intel i930. The controller 16, 17, single port adapters 120, 121, and multi-port adapter 20 are each provided with an operating system and application programs for operating in accordance with he present invention. The application programs may comprise one or more computer program products, comprising computer readable program code. The computer program product may be supplied electronically, as from a network or one of the hosts 11, 12 at a communications interface. Alternatively, the computer program product may be supplied at an I/O station of the controller or from a data storage library from a storage media which stores executable computer instructions, and comprises an article of manufacture, such as a magnetic tape cartridge or a magnetic diskette. Other suitable storage media are optical disk cartridges, read only memories (ROM) or programmable read only memories (PROM). The requirement for the storage media or memories is that they store digital representations of computer executable instructions.

Referring to FIGS. 1A, 1B, 2A and 2B, the controller 16, 17 performs data transfers over the ports in a queued order, which may comprise the order in which the data transfer requests are received. The present invention comprises the provision for reordering the sequence of jobs with the goal of keeping the input/output ports 26, 27, 126, 127 fully utilized, for example, without the necessity to fall idle while waiting for operations to complete at the other port.

Specifically, the controller 16, 17 maintains, either itself or at a multi-port adapter, a queue of jobs to be conducted at each port 26, 27, 126, 127. The numbers of jobs at each port may be very different, or the jobs may complete at differing rates, such that jobs in the queues for the respective ports that require activity at the other port may have to wait for the job at the other port to reach the end of the queue. While waiting for the job at the other port to complete, the present port remains idle.

The present invention identifies certain types of jobs as ones that may be taken out of queue order. The jobs may be identified by either (1) the specific type of job, such as a job conducted by a controller rather than a host, or (2) by adding heuristic information to the job as placed in a queue.

Figure 3:
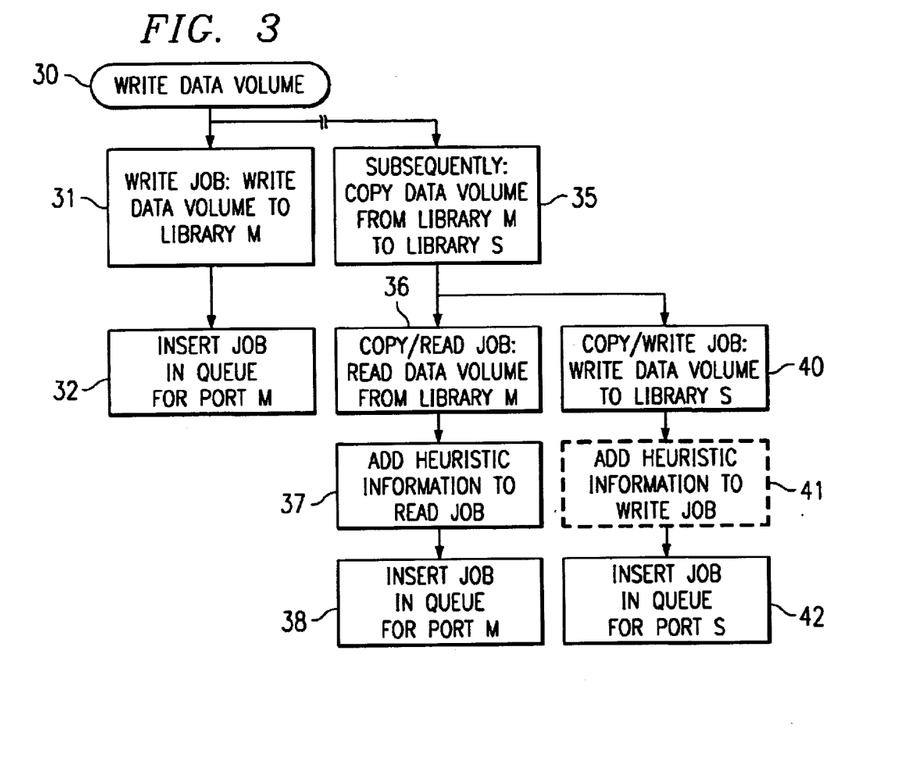
FIG. 3 is a flow chart depicting an embodiment of a method in which heuristic information is added to jobs for a queue in accordance with the present invention.

An example of a method in which jobs are identified as ones that may be taken out of queue order in accordance with the present invention is illustrated in FIG. 3. Additionally referencing FIGS. 1A–2B, the specific example comprises the redundant storage of data in dual libraries 14, 15. The data is initially received from a host system 11, 12 and stored in one of the libraries, e.g., a master library 15. Subsequently, the controller 16, 17 reads the data from the one library 15 and writes it to the dual library, e.g., a slave library 14, thereby creating a copy of the data. This creates the situation where the controller cannot write the data to the dual library until it is read from the one library.

The write process is initiated at step 30, for example, by the request for a write of a data volume from one of the host systems 11, 12. In step 31, the write job is established for writing the data volume to the master library 15, and, in step 32, the write job is inserted in the queue for the input/output port 27, 127 which is coupled to the master library 15.

Subsequently, and after the write job reaches the top of the queue and is executed, or at some later time, the controller 16, 17 copies the data volume to the slave library 14, beginning at step 35. In step 36, the "COPY READ" job is established for reading the data volume from the master library 15. In accordance with the present invention, a job, or a job of a particular type, may be identified as one that may be taken out of queue order. An example is a COPY READ job, because the data cannot be written to one library until it is read from the other. Thus, in one embodiment of the method, heuristic information is added to the read job in step 37. The purpose of the heuristic information is to give an increased priority to the read job and allow the multi-port adapter reorder the jobs for increased efficiency. The increased priority may insure that the read job is ready to be conducted by the time that the write job is ready for the slave library 14. In the instant example, the read job, in step 38, is inserted in the queue for the input/output port 27, 127 which is coupled to the master library 15.

At substantially the same time, in step 40, the "COPY WRITE" job is established for writing the data volume to the slave library 14. Heuristic information may be added to the write job in step 41 to also give the write job priority, but, in the instant example, is not necessary. Rather, it is necessary that the read job be ready by the time that the write job is ready, so that the input/output port, e.g., port 26, 126, does not have to wait in idle mode while the read job moves to the top of the queue for that port, e.g., port 27, 127. Then, in step 42, the write job is inserted in the queue for the input/output port 26 which is coupled to the slave library 14. Although the heuristic information may originate at a host system 11, 12 or at the computer processor 22, 122, it, preferably, is provided to the instant application program of the multi-port adapter 20 by other code of the computer processor 22 or the controller 16. Thus, the identification of the jobs that may be taken out of queue order is made by processor 22 for the adapter. The heuristic information may be attached to a queued job based on the type of job and/or operation, including whether the controller performs the jobs.

In an alternative embodiment of the present invention, the identification of a job as one that may be taken out of queue order is made simply by the type of command itself, or by the fact that the controller is conducting the job, or involves two ports of the controller. Thus, in step 36, the "COPY READ" job is predetermined to be the type of job that is to be taken out of queue order, or is an indication that the controller will conduct the job. As the result, step 37 may be skipped, as shown by arrow 137, and the job is inserted in the queue for input/output port 27, 127. Again, the "COPY WRITE" job is established, and may also be a type of job having priority, but that is not necessary. Preferably, the "COPY READ" job is established by processor 122 of controller 17, so that the processor 122 may select the job out of queue order and operate the associated adapter 121 and port 127 without forwarding selection criteria to the adapter 121.

Herein, "identification", based on predetermined criteria, of a job that may be taken out of queue order comprises any of the following: a job type, such as "COPY READ", a specific command, the source or destination of the job, or the device conducting the job, such as the controller, or involving two ports of the controller.

Figures 4, 6:
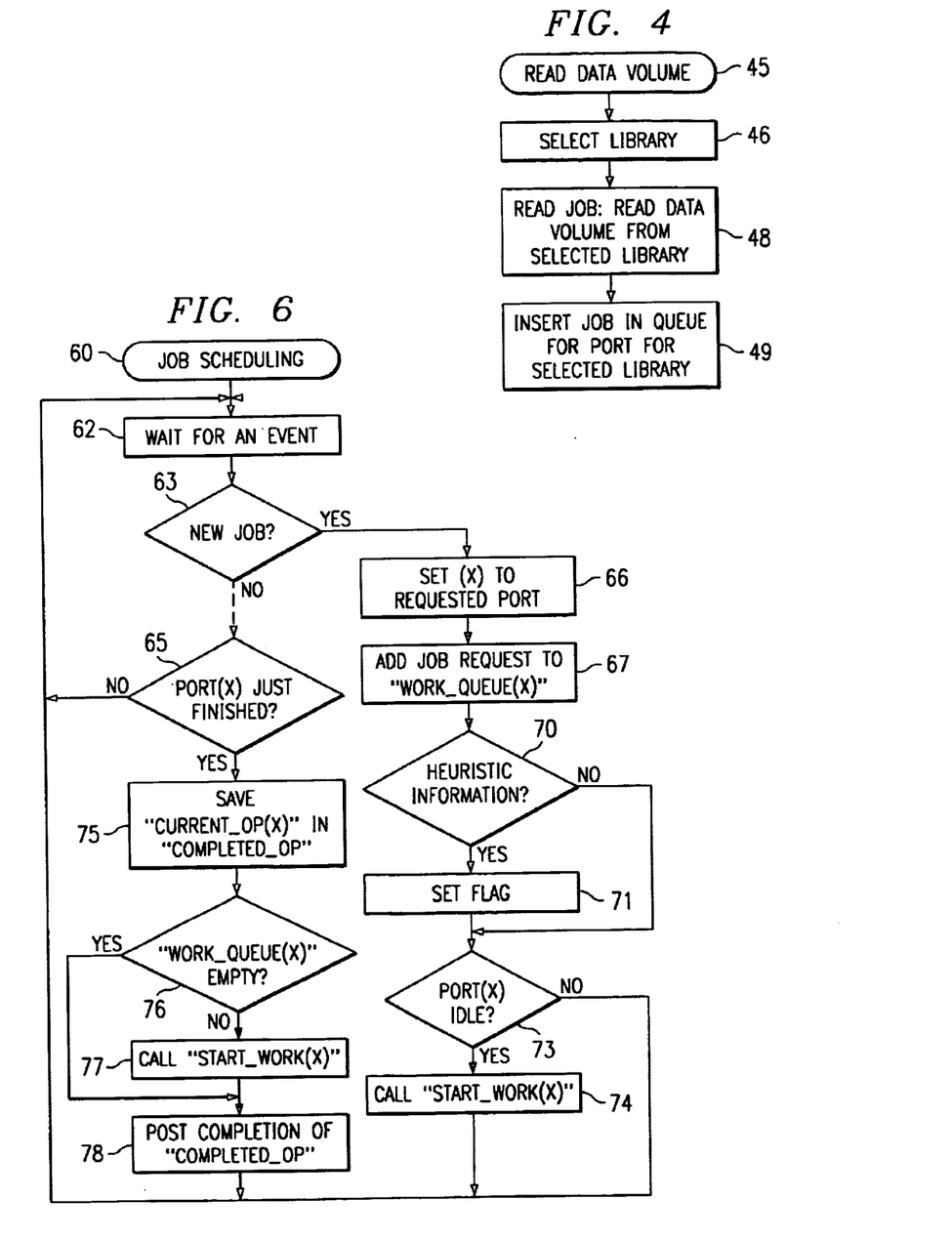
FIG. 4 is a flow chart depicting an embodiment of a method in which no heuristic information is added to jobs for a queue.
FIGS. 6 and 7 are flow charts depicting an embodiment of a method for scheduling jobs in accordance with the present invention.

In the present example, a method in which no identification is made and no heuristic information is added to jobs for a queue is illustrated in FIG. 4. This may occur for a read job, initiated at step 45, for example, by the request for a read of a data volume by one of the host systems 11, 12. In step 46, the host system or the multi-port adapter selects the library from which the data volume will be read. As an example, the library having the most current copy of the data volume will be selected as the library for which the job is established, in step 48. Then, in step 49, the read job is inserted in the queue for the input/output port 26, 27 which is coupled to the selected library 14, 15.

Figure 5A:
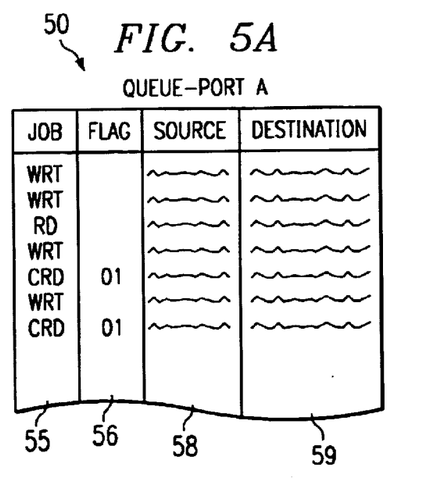
FIGS. 5A and 5B are diagrammatic representations of job queues for two ports of the adapter of FIG. 2.
Figure 5B:
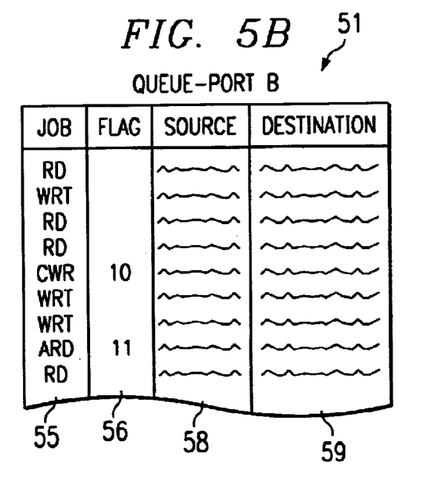

Examples of queues, for example, for two input/output ports, are illustrated in FIGS. 5A and 5B. Thus, queue 50 may be associated with port 27, 127, and queue 51 may be associated with port 26, 126. Each queue may comprise a list in memory 19 of processor 18 of the multi-port adapter of controller 16, or a list in the memory 123 of the computer processor 122 of controller 17, or in the hardware of the input/output port 26, 27, 126, 127. An example of the information of the queues comprises the queued job 55, some of which are especially identified as "CRD" for "COPY READ", alternatively, a flag 56 indicating the heuristic information attached to the queued job, the source 58 of the data volume, and the destination 59 of the data volume. Other information to be associated with each job may be envisioned by those of skill in the art. Jobs are moved in the queue, for example, by the use of pointers which determine the order of jobs in the queue. Typically, queues are ordered in a FIFO manner.

Thus, referring additionally to FIGS. 1A–3, if the computer processor 22 adds heuristic information to the read job in step 37, or adds heuristic information to the write job in step 41, the heuristic information may take the form of a flag, and the instant application program of the computer processor 18 sets the appropriate flag in column 56 of queue 50 or 51. The flag may take any of several forms, from a single bit indicating that the flag is set, to multiple bits indicating the type of flag. Examples of the type of flag include whether it is a read job that is part of a copy operation, whether it is a write job that is part of a copy operation and triggered by a read job, and whether it is another type of job that requires priority. In the examples at column 56 of queues 50 and 51 of FIGS. 5A and 5B, a "01" represents a read job that is part of a copy operation, a "10" represents a write job that is part of a copy operation and triggered by a read job, and a "11" represents another type of job that requires priority.

If more than two potentially interacting ports are provided, the flag at column 56 may also identify the port that interacts in the specific operation and requires that the present job of the specific operation have priority.

Alternatively, the command, the type of job, or the device conducting the job may indicate whether the job may be taken out of queue order. Thus, the jobs as posted in column 55, the source or destination of columns 58, 59, etc. provide the indication. As examples at column 55 of queues 50 and 51 of FIGS. 5A and 5B, "CRD" represents a read job that is part of a copy operation, "CWR" represents a write job that is part of a copy operation and triggered by a read job, and "ARD" represents another type of job that requires priority.

Figure 7:
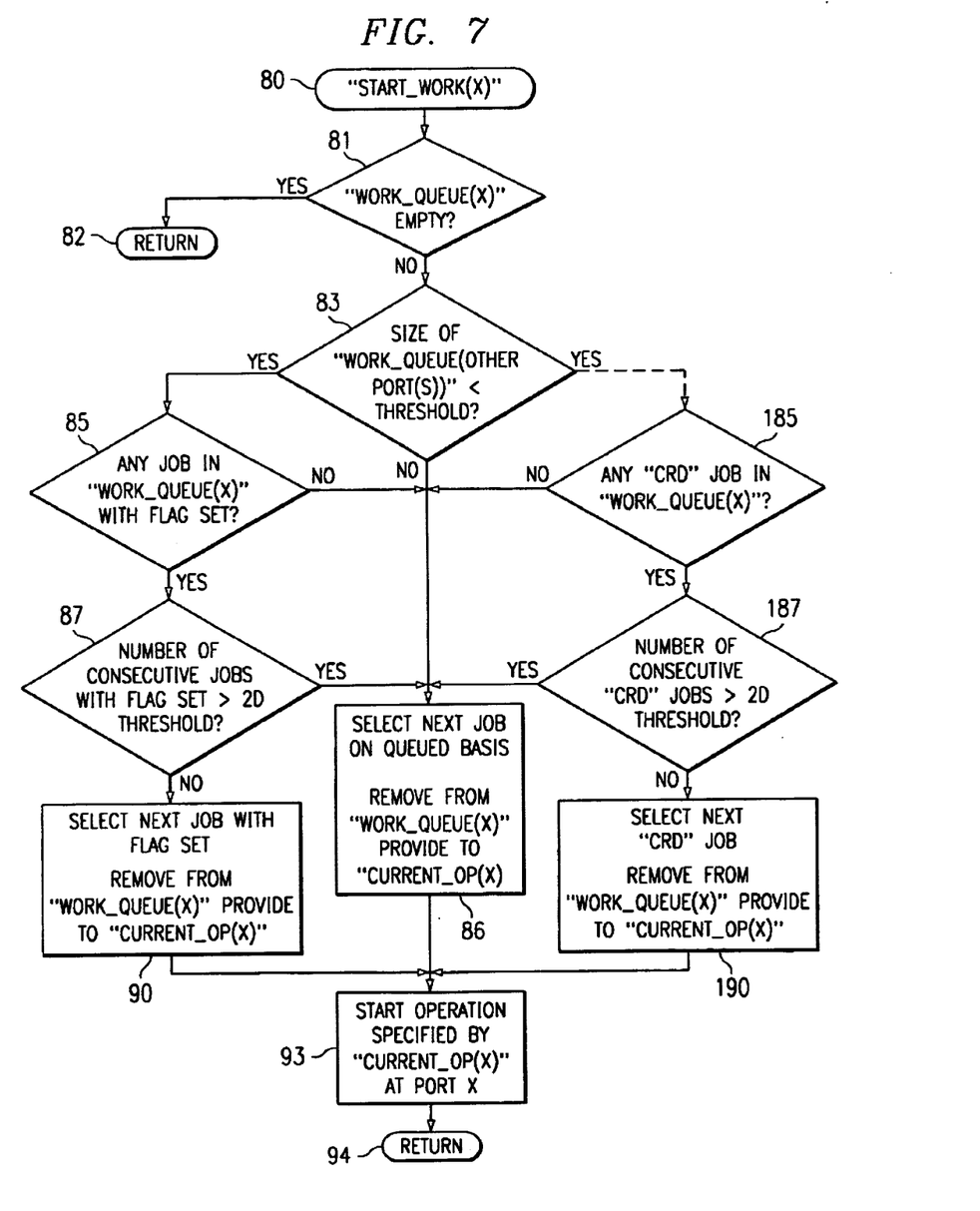

An embodiment of a method for scheduling jobs of the multi-port input/output adapter in accordance with the present invention is illustrated in FIGS. 6 and 7, beginning at step 60. As discussed above, the method may be implemented as a computer program product usable with a programmable computer having computer readable program code embodied therein, such as computer processor 22, processor 18, or computer processor 122.

Referring additionally to FIGS. 1–5, in step 62, the process waits for an event to occur. Upon the occurrence of an event, step 63 determines whether that event is a a new job request for one of the input/output ports. If not, "NO", the process looks for other events, including whether a port just finished a job, in step 65. The request for a new job may have originated with a host system 11, 12, a data storage library 14, 15, or with the computer processor 22, but, preferably, is provided to the instant application program by other code of the computer processor 22. If a new job has been requested as determined by step 63, step 66 determines the requested port, setting the variable "X" to identify the requested port, and, in step 67, adds the job request to the queue 50 or 51 for the requested port, identified in the example as "WORK_QUEUE (X)".

In accordance with one embodiment of the invention, step 70 determines whether heuristic information is added to the job request, and, if so, "YES", sets the flag at column 56 of the queue 50 or 51 for the requested job at the requested port in step 71. If there is no heuristic information, "NO", step 71 is not conducted for that job. As is understood by those of skill in the art, steps 67–71 may be reordered so that the heuristic information flag is set as or before the job request is added to the work queue. As discussed above, the flag may also identify the other port associated with the operation of the current job.

In accordance with an alternative embodiment of the invention, there is no heuristic information. Hence, no flag is set in step 71. Rather, the command or job type, etc., provides the indication whether the job may be taken out of queue order.

Step 73 determines whether the port "X" is currently idle, and calls "START_WORK (X)" in step 74 if the port is idle. In either case, the process cycles back to step 62 to wait for an event.

Referring to step 65, if a port "X" has just finished a job, "YES", the "CURRENT_OP (X)", which will be discussed, is indicated as having been completed, e.g., by saving in "COMPLETED_OP (X)", in step 75. In step 76, the process determines whether the queue 50 or 51 for port "X" is empty. If not, and there is at least one job currently in the queue, step 77 calls "START_WORK (X)". Step 77 is essentially the same as step 74, but instead the process continues at step 78 to post the completion of the just finished job. Similarly, if the queue is empty, "YES" in step 76, the completion "COMPLETED_OP (X)" of the just finished job is posted to the computer processor 22, 18, 122.

Embodiments of a method for selecting the next job for the controller in accordance with the present invention are illustrated in FIG. 7, beginning at step 80, comprising "START_WORK (X)" as called by step 74 or by step 77.

In step 81, the queue 50 or 51 for the requested port, identified in the example as "WORK_QUEUE (X)", is checked to determine whether the queue is empty. If the queue is now empty, step 82 returns to the process of FIG. 6.

If the queue, in step 81, has at least one job, "NO", step 83 determines whether the number of queued jobs of each queue for the other port or ports is less than a threshold. The threshold means that only a few jobs are being conducted at the other port, and presents the possibility that a job at the other port which is dependent upon a job queued at the present port must wait while the present queue is emptied so that the job queued for the present port is able to reach the top of the queue. As discussed above, if there are more than two ports, a flag may identify the associated port, and only its queue is checked.

Hence, in accordance with the present invention, if the number of jobs in the other queue is less than the threshold, "YES" in step 83, the next job for the present port is selected from the jobs in the queue for the one port that may be taken out of queue order. Thus, in one embodiment, in step 85, the process determines whether any job in the present work queue, e.g., "WORK_QUEUE (X)", has the heuristic information flag set. If not, "NO", there is no need for priority, and the next job is selected on a normal queued sequence basis in step 86.

Step 87 comprises an optional step and is provided to prevent jobs having "priority" from monopolizing the ports. Hence, step 87 determines whether queued jobs having the heuristic information flag set have been selected continuously, exceeding a second threshold, and, if so, "YES", the "priority" job is not selected, but rather, step 86 selects the next job for the one port from the jobs in the queue for the one port on the normal queued basis.

Thus, if step 87 indicates that "priority" jobs have not been selected continuously to exceed the second threshold, and, in accordance with the present invention, step 83 indicated that the number of jobs in the other queue is less than the threshold, step 90 selects the next job for the present port from the jobs in the queue having the attached heuristic information. If more than one job has the attached heuristic information, preferably, the next job is selected on a FIFO basis. Thus, step 90 removes the selected job from the present work queue, e.g., "WORK_QUEUE (X)", and provides the job to "CURRENT_OP (X)".

In an alternative embodiment of the invention, in step 185, the process determines whether any job in the present work queue for the one port is a job of a type that may be taken out of queue order, such as COPY READ, or "CRD". If not, "NO", there is no need for priority, and the next job is selected on a normal queued basis in step 86. As discussed above, step 187 is optional to prevent jobs having "priority" from monopolizing the ports. Step 187 determines whether the COPY READ jobs have been selected continuously, exceeding the second threshold. If so, the "priority" job is not selected, and the next normal queued job is selected in step 86.

However, if the second threshold is not exceeded, step 190 selects the next job for the present port from the jobs in the queue of the type that may be taken out of queue order, e.g., "CRD", on a FIFO basis, as discussed above.

Then, in step 93, the job specified by "CURRENT_OP (X)", either from the normal sequence of step 86 or from the priority selection of step 90, is begun, and the process returns to the process of FIG. 6 in step 94.

As is understood by those of skill in the art, the steps illustrated in FIGS. 6 and 7 may be reordered, optional steps omitted, and equivalent steps substituted at any point in the process.

Thus, in the instant example, a copy operation requiring that a read job be conducted at one input/output port so that a write job may then be conducted at the other input/output port either will be provided with the heuristic information at least for the read job or is identified as the type of job that may be taken out of queue order, e.g., "CRD". When the port having the queued read job, completes a previous job, the process first checks the queue of the write job to see if the number of jobs is less than the threshold, indicating that the write job might have to wait. If the number of jobs is less than the threshold, the process determines whether any job (the read job) either has the heuristic information attached or is identified as a job which may be taken out of queue order.

The read job does have the heuristic information attached or is a "priority" job, and the process selects that read job on a priority basis. Only if the "priority" jobs have monopolized the port, will the "priority" read job not be selected.

As the result in accordance with the present invention, the read job that is part of the copy operation will be selected immediately for the present input/output port, with the result that the write job that is the other part of the copy operation will not have to wait, and the other port will not be left idle. The present invention thus may increase the throughput of the multi-port adapter, increasing the efficiency of the adapter.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for scheduling input/output jobs for multiple ports of a controller, said controller having a queue of said jobs for each of said ports, each said queue arranging said jobs in a queued order for selection by said associated port, comprising the steps of:
   identifying, based on predetermined criteria, ones of said jobs as ones that may be conducted out of queue order;
   upon selecting a next job for one of said ports, determining the number of said queued jobs of each said queue for each other of said ports;
   determining whether said number of queued jobs of each said queue for said other ports is less than a threshold; and
   if said number of jobs is less than said threshold, selecting said next job, for said one port from said jobs in said queue for said one port, having said out of queue order identification; else, selecting said next job for said one port from said jobs in said queue for said one port on said queued basis.

2. The method of claim 1, additionally comprising the step of, if said number of jobs is less than said threshold, determining whether queued jobs having said out of queue order identification have been selected continuously, exceeding a second threshold, and, if so, selecting said next job for said one port from said jobs in said queue for said one port on said queued basis.

3. The method of claim 1, wherein said jobs are of at least two types, and said identifying step additionally comprises defining at least one of said types of jobs as said jobs for said identification.

4. The method of claim 3, wherein at least one of said types of jobs is performed by said controller, and wherein said defining step comprises defining at least one of said types of controller-performed jobs as said jobs for said identification.

5. The method of claim 4, wherein said controller comprises a node of a storage area network, and said ports are each coupled to an other node of said storage area network, and wherein said defining step controller-performed jobs relate to transfers between said other nodes of said storage area network.

6. The method of claim 5, wherein each of at least two of said ports are coupled to one of a plurality of data storage subsystems, and wherein said defining step controller-performed jobs comprises copying data from one of said data storage subsystems to another of said data storage subsystems.

7. The method of claim 6, wherein said copying comprises a read of data from said one of said data storage subsystems and a write of said data to said another of said data storage subsystems, and wherein said defining step controller-performed jobs comprises said reading of data from said one of said data storage subsystems.

8. The method of claim 1, wherein said identifying step additionally comprises attaching heuristic information to said ones of said queued jobs.

9. The method of claim 8, wherein said controller comprises a multi-port adapter providing said multiple ports and having said queue of jobs for each of said ports, and wherein said controller conducts said identifying step, supplying said heuristic information for said ones of said jobs to said multi-port adapter for attachment to said jobs at said queues.

10. The method of claim 1, wherein said controller comprises a plurality of single port adapters for providing said multiple ports, and wherein said controller maintains said queues and conducts said identifying step.

11. A controller for scheduling input/output jobs, comprising:
   a plurality of input/output ports;
   a plurality of queues, each associated with one of said input/output ports; and
   at least one processor, said processor:
      identifies, based on predetermined criteria, ones of said jobs as ones that may be conducted out of queue order;
      arranges said jobs in each of said queues in a queued order for selection by said associated port;
      upon selecting a next job for one of said ports, determines the number of said queued jobs of each said queue for each other of said ports;
      determines whether said number of queued jobs of each said queue for said other ports is less than a threshold; and
      if said number of jobs is less than said threshold, selects said next jobs for said one port from said jobs in said queue for said one port, having said out of queue order identification; else, selects said next job for said one port from said jobs in said queue for said one port on said queued basis.

12. The controller of claim 11, wherein said at least one processor, additionally, if said number of jobs is less than said threshold, determines whether queued jobs having said out of queue order identification have been selected continuously, exceeding a second threshold, and, if so, selects said next job for said one input/output port from said jobs in said queue for said one input/output port on said queued basis.

13. The controller of claim 11, wherein said jobs are of at least two types, and said at least one processor additionally defines at least one of said types of jobs for said identification, and provides said identification for said jobs for said queues.

14. The controller of claim 13, wherein at least one of said types of jobs is performed by said controller, and wherein said at least one processor defines at least one of said types of controller-performed jobs as said jobs for said identification.

15. The controller of claim 14, wherein said controller comprises a node of a storage area network, wherein said input/output ports are each coupled to an other node of said storage area network, and wherein said at least one processor defines said controller-performed jobs as jobs relating to transfers between said other nodes of said storage area network.

16. The controller of claim 15, wherein each of at least two of said input/output ports are coupled to one of a plurality of data storage subsystems, and wherein said at least one processor defines said controller-performed jobs as jobs comprising copying data from one of said data storage subsystems to another of said data storage subsystems.

17. The controller of claim 16, wherein said copying comprises a read of data from said one of said data storage subsystems and a write of said data to said another of said data storage subsystems, and wherein said at least one processor defines said controller-performed jobs as comprising said reading of data from said one of said data storage subsystems.

18. The controller of claim 11, wherein said at least one processor additionally attaches heuristic information to said identified ones of said jobs.

19. The controller of claim 18, wherein said plurality of input/output ports and said plurality of associated queues comprise a multi-port adapter, and wherein said at least one processor comprises a controller processor for identifying said ones of said jobs and attaching said heuristic information to said identified ones of said jobs, and an adapter processor for arranging said jobs in said queues and selecting said jobs.

20. The controller of claim 11, wherein said plurality of input/output ports comprise a plurality of single port adapters.

21. A data storage system selecting jobs to be performed by said data storage system, comprising:
    a plurality of data storage subsystems; and
    an intermediate controller comprising:
        a plurality of input/output ports, each coupled to one of said data storage subsystems;
        a plurality of queues, each associated with one of said input/output ports; and
        at least one processor, said processor:
            identifies, based on predetermined criteria, ones of said jobs as ones that may be conducted out of queue order;
            arranges said jobs in each of said queues in a queued order for selection by said associated input/output port;
            upon selecting a next job for one of said input/output ports, determines the number of said queued jobs of each said queue for each other of said input/output ports;
            determines whether said number of queued jobs of each said queue for said other input/output ports is less than a threshold;
            if said number of jobs is less than said threshold, selects said next job for said one input/output port, from said jobs in said queue for said one input/output port, having said out of queue order identification; else, selects said next job for said one input/output port from said jobs in said queue for said one input/output port on said queued basis; and
            operating said data storage system to conduct said next selected job at said one input/output port.

22. The data storage system of claim 21, wherein said at least one processor, additionally, if said number of jobs is less than said threshold, determines whether queued jobs having said out of queue order identification have been selected continuously, exceeding a second threshold, and, if so, selects said next job for said one input/output port from said jobs in said queue for said one input/output port on said queued basis.

23. The data storage system of claim 21, wherein said jobs are of at least two types, and said at least one processor additionally defines at least one of said types of jobs for said identification, and provides said identification for said jobs for said queues.

24. The data storage system of claim 23, additionally comprising at least one host port, wherein at least one of said types of jobs is performed by said controller via at least one of said input/output ports without the involvement of said host port, and wherein said at least one processor defines at least one of said types of input/output port performed jobs as said identified jobs.

25. The data storage system of claim 23, wherein said controller comprises a node of a storage area network, wherein said data storage subsystems comprise other nodes of said storage area network, and wherein said at least one processor defines jobs relating to transfers between said other nodes of said storage area network as said selected jobs.

26. The data storage system of claim 23, wherein said at least one processor defines said identified jobs as jobs comprising copying data from one of said data storage subsystems to another of said data storage subsystems.

27. The data storage system of claim 26, wherein said copying comprises a read of data from said one of said data storage subsystems and a write of said data to said another of said data storage subsystems, and wherein said at least one processor defines said identified jobs as comprising said reading of data from said one of said data storage subsystems.

28. The data storage system of claim 21, wherein said at least one processor additionally attaches heuristic information to said identified ones of said jobs.

29. The data storage system of claim 28, wherein said plurality of input/output ports and said plurality of associated queues comprise a multi-port adapter, and wherein said at least one processor comprises a controller processor for identifying said ones of said jobs and attaching said heuristic information to said identified ones of said jobs, and an adapter processor for arranging said jobs in said queues and selecting said jobs.

30. The data storage system of claim 21, wherein said plurality of input/output ports comprise a plurality of single port adapters.

31. A job scheduling computer program product usable with a programmable computer having computer readable program code embodied therein, for use with multiple ports of a controller, said controller having a queue of jobs for each of said ports, each said queue arranging said jobs in a queued order for selection by said associated port, comprising:
    computer readable program code which causes a computer processor to identify, based on predetermined criteria, ones of said jobs as ones that may be conducted out of queue order;
    computer readable program code which causes a computer processor to arrange said jobs in each of said queues in a queued order for selection by said associated port;
    computer readable program code which causes a computer processor to, upon selecting a next job for one of said ports, determine the number of said queued jobs of each said queue for each other of said ports;
    computer readable program code which causes a computer processor to determine whether said number of queued jobs of each said queue for said other ports is less than a threshold; and computer readable program code which causes a computer processor to, if said number of jobs is less than said threshold, select said next job, for said one port from said jobs in said queue for said one port, having said out of queue order identification; else, select said next job for said one port from said jobs in said queue for said one port on said queued basis.

32. The computer program product of claim 31, additionally comprising computer readable program code which causes a computer processor to, if said number of jobs is less than said threshold, determine whether queued jobs having said out of queue order identification have been selected continuously, exceeding a second threshold, and, if so, select said next job for said one port from said jobs in said queue for said one port on said queued basis.

33. The computer program product of claim 31, wherein said jobs are of at least two types, and wherein said computer program product additionally comprises computer readable program code which causes a computer processor to define at least one of said types of jobs for said identification, and to provide said identification for said jobs for said queues.

34. The computer program product of claim 33, wherein at least one of said types of jobs is performed by said controller, and wherein said computer readable program code which causes a computer processor to define said jobs, defines at least one of said types of controller-performed jobs as said jobs for said identification.

35. The computer program product of claim 34, wherein said controller comprises a node of a storage area network, and said ports are each coupled to an other node of said storage area network, and wherein said computer readable program code which causes a computer processor to define said jobs, defines said controller-performed jobs which relate to transfers between said other nodes of said storage area network as said jobs for said identification.

36. The computer program product of claim 35, wherein each of at least two of said ports are coupled to one of a plurality of data storage subsystems, and wherein said computer readable program code which causes a computer processor to define said jobs, defines controller-performed jobs copying data from one of said data storage subsystems to another of said data storage subsystems as said jobs for said identification.

37. The computer program product of claim 36, wherein said copying comprises a read of data from said one of said data storage subsystems and a write of said data to said another of said data storage subsystems, and wherein said computer readable program code which causes a computer processor to define said jobs, defines controller-performed jobs for said copying which comprise said reading of data from said one of said data storage subsystems as said jobs for said identification.

38. The computer program product of claim 31, additionally comprising computer readable program code which causes a computer processor to attach heuristic information to said identified ones of said jobs.

39. The computer program product of claim 38, wherein said controller comprises a multi-port adapter providing said multiple ports and having said queue of jobs for each of said ports, and wherein said computer readable program code operates a controller processor for identifying said ones of said jobs and attaching said heuristic information to said identified ones of said jobs, and operates an adapter processor for arranging said jobs in said queues and selecting said jobs.

40. The computer program product of claim 31, wherein said controller comprises a plurality of single port adapters for providing said multiple ports, and wherein said computer readable program code operates a controller processor for maintaining said queues and conducting said identifying step.

* * * * *

UNITED STATES PATENT AND TRADEMARK OFFICE
CERTIFICATE OF CORRECTION

PATENT NO.   : 6,687,905 B1
DATED        : February 3, 2004
INVENTOR(S)  : Day, III et al.

It is certified that error appears in the above-identified patent and that said Letters Patent is hereby corrected as shown below:

Column 10,
Line 38, change "next jobs" to -- next job, --

Signed and Sealed this

Eleventh Day of May, 2004

JON W. DUDAS
*Acting Director of the United States Patent and Trademark Office*